(12) United States Patent  
Nelson et al.

(10) Patent No.: US 9,866,799 B1  
(45) Date of Patent: Jan. 9, 2018

(54) VIDEO MONITORING SYSTEM FOR AN EXIT

(71) Applicant: Target Brands, Inc., Minneapolis, MN (US)

(72) Inventors: Jaclyn Nelson, Tigard, OR (US); Lisa A. Hurst, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 401 days.

(21) Appl. No.: 14/816,305

(22) Filed: Aug. 3, 2015

Related U.S. Application Data

(62) Division of application No. 12/250,210, filed on Oct. 13, 2008, now Pat. No. 9,123,223.

(51) Int. Cl.
*H04N 7/18* (2006.01)
*H04N 5/225* (2006.01)

(52) U.S. Cl.
CPC ........... *H04N 7/183* (2013.01); *H04N 5/2256* (2013.01)

(58) Field of Classification Search
CPC .............................. H04N 7/183; H04N 5/2256
USPC ....................................................... 348/143
See application file for complete search history.

(56) References Cited

U.S. PATENT DOCUMENTS

| | | | |
|---|---|---|---|
| 3,665,448 A | 5/1972 | McGlinchey et al. | |
| 3,812,287 A | 5/1974 | Lemelson | |
| 5,347,262 A | 9/1994 | Thurmond et al. | |
| 5,354,974 A | 10/1994 | Eisenberg | |
| 5,526,133 A * | 6/1996 | Paff | G08B 13/19663 348/153 |
| 5,623,249 A * | 4/1997 | Camire | G08B 13/19602 340/511 |
| 6,424,371 B1 | 7/2002 | Wen | |
| 6,550,671 B1 | 4/2003 | Brown et al. | |
| 7,010,501 B1 | 3/2006 | Roslak et al. | |
| 7,446,803 B2 * | 11/2008 | Leow | G06F 17/30817 348/143 |
| 7,684,623 B2 | 3/2010 | Shen et al. | |
| 7,760,908 B2 * | 7/2010 | Curtner | G06F 17/3079 348/143 |
| 2002/0054211 A1 | 5/2002 | Edelson et al. | |
| 2002/0135801 A1 | 9/2002 | Tessman et al. | |

(Continued)

FOREIGN PATENT DOCUMENTS

JP 2-239372 9/1990

OTHER PUBLICATIONS

"So Why Isn't Shrink Shrinking?" by Jumbi Edulbehram, Ph.D., contributing writer, http://www.securitymagazine.com posted: Jan. 1, 2006, printed Oct. 13, 2008 (pp. 1-7).

(Continued)

*Primary Examiner* — Imad Hussain  
(74) *Attorney, Agent, or Firm* — Nixon & Vanderhye P.C.

(57) ABSTRACT

An embodiment of a video monitoring system has at least one video camera directed at a detection system for obtaining video of the detection system. The detection system has a light source. A controller is coupled to the at least one video camera. The controller is configured to determine that the light source illuminates from the video of the detection system obtained by the at least one video camera. The controller is further configured to indicate an alarm in response to determining that the light source illuminates.

20 Claims, 5 Drawing Sheets

(56) References Cited

U.S. PATENT DOCUMENTS

| | | | |
|---|---|---|---|
| 2002/0147982 A1* | 10/2002 | Naidoo | G08B 13/19645 |
| | | | 725/105 |
| 2002/0158762 A1 | 10/2002 | Nguyen et al. | |
| 2003/0005464 A1* | 1/2003 | Gropper | G06F 19/321 |
| | | | 725/115 |
| 2003/0025599 A1* | 2/2003 | Monroe | G08B 13/19602 |
| | | | 340/531 |
| 2003/0191766 A1* | 10/2003 | Elin | G06F 17/3028 |
| 2003/0197612 A1* | 10/2003 | Tanaka | G06K 17/00 |
| | | | 340/572.1 |
| 2004/0022516 A1* | 2/2004 | Yamashiro | G08B 13/1961 |
| | | | 386/223 |
| 2004/0100652 A1* | 5/2004 | Cooper | G06K 17/00 |
| | | | 358/1.15 |
| 2004/0117638 A1 | 6/2004 | Monroe | |
| 2004/0161133 A1* | 8/2004 | Elazar | G01S 3/7864 |
| | | | 382/115 |
| 2005/0057650 A1 | 3/2005 | Kogane et al. | |
| 2005/0128293 A1* | 6/2005 | Wilsey | G06K 7/10079 |
| | | | 348/143 |
| 2005/0200494 A1 | 9/2005 | Herrmann et al. | |
| 2006/0001537 A1* | 1/2006 | Blake | G08B 13/19656 |
| | | | 340/521 |
| 2006/0004581 A1 | 1/2006 | Claudatos et al. | |
| 2006/0004582 A1 | 1/2006 | Claudatos et al. | |
| 2006/0109341 A1 | 5/2006 | Evans | |
| 2006/0184553 A1* | 8/2006 | Liu | G06F 17/30545 |
| 2007/0014428 A1* | 1/2007 | Kountchev | G06T 1/0028 |
| | | | 382/100 |
| 2007/0016598 A1 | 1/2007 | Tessman et al. | |
| 2007/0050829 A1* | 3/2007 | Asami | H04N 1/00209 |
| | | | 725/105 |
| 2007/0058842 A1 | 3/2007 | Vallone et al. | |
| 2007/0061696 A1 | 3/2007 | Vallone et al. | |
| 2007/0182818 A1 | 8/2007 | Buehler | |
| 2007/0282665 A1 | 12/2007 | Buehler et al. | |
| 2007/0283004 A1 | 12/2007 | Buehler | |
| 2008/0012716 A1 | 1/2008 | Saltzstein et al. | |
| 2008/0043101 A1* | 2/2008 | Sharma | G08B 13/19643 |
| | | | 348/143 |
| 2008/0062413 A1 | 3/2008 | Ashdown et al. | |
| 2008/0080764 A1 | 4/2008 | Kim et al. | |
| 2008/0180537 A1* | 7/2008 | Weinberg | H04N 5/2256 |
| | | | 348/211.99 |
| 2009/0040302 A1* | 2/2009 | Thompson | G08B 13/19615 |
| | | | 348/143 |
| 2010/0145899 A1 | 6/2010 | Buehler | |
| 2010/0171619 A1 | 7/2010 | Hall | |
| 2012/0249790 A1* | 10/2012 | Golan | G06K 9/00362 |
| | | | 348/143 |

OTHER PUBLICATIONS

GeoVision news GeoVision to Boost Up Loss Prevention in Retail through EAS Integration http://www.geovision.com.tw/english . . . , pp. 1-3, Sep. 26, 2008.

Geo Vision Video Management Solution—Retail Application for Large Shopping Malls and Chain-store Enterprises (5 pages), website at: http://www. geovision.com.tw/upload/en/RetailApplication_VideoMGTSolution.pdf.

Micropack. "CCTV Visual Flame Detection System." May 2007. Web. <www.micropackamericas.com/library/salesbrochure.pdf>.

* cited by examiner

VIDEO MONITORING SYSTEM FOR AN EXIT

CROSS-REFERENCES TO RELATED APPLICATIONS

This application is a divisional of U.S. patent application Ser. No. 12/250,210, filed Oct. 13, 2008, pending, the entire content of which is hereby incorporated by reference in this application.

STATEMENT REGARDING FEDERALLY SPONSORED RESEARCH OR DEVELOPMENT (NOT APPLICABLE)

FIELD OF THE INVENTION

The present disclosure relates generally to video monitoring, and in particular, the present disclosure relates to a video monitoring system for an exit of a facility.

BACKGROUND OF THE INVENTION

Electronic article surveillance (EAS) is a method for detecting theft from facilities, such as stores, libraries, etc. For example, articles, such as merchandise, books, etc., are tagged with tags, such as radio frequency identification (RFID) tags, that when activated can be detected by a detector typically located at an exit of a facility. Note that for some facilities, an exit can also serve as an entrance of the facility.

The tags are deactivated or removed when an article is purchased or checked out. However, when the detector detects an activated tag, an alarm, such as an audible alarm, e.g., a bell, buzzer, or the like, and/or a visible alarm, e.g., a light, is activated for notifying personnel of the facility of a possible theft.

In addition, some exits of some facilities are monitored with cameras that are directed at the exits. Some facilities have multiple exits with continuous video monitoring, at least during hours of operation of the facility, meaning that several hours of video are recorded at each exit each day. Therefore, in order to review video corresponding to certain events occurring at an exit, several hours of video might need to be reviewed in order to locate those events on video.

For the reasons stated above, and for other reasons stated below which will become apparent to those skilled in the art upon reading and understanding the present specification, there is a need in the art for alternative video monitoring of exits of facilities.

BRIEF SUMMARY OF THE INVENTION

One embodiment of the present invention provides a video monitoring system. The video monitoring system has at least one video camera directed at a detection system for obtaining video of the detection system. The detection system has a light source. A controller is coupled to the at least one video camera. The controller is configured to determine that the light source illuminates from the video of the detection system obtained by the at least one video camera. The controller is further configured to indicate an alarm in response to determining that the light source illuminates.

DETAILED DESCRIPTION OF THE INVENTION

Figure 1:
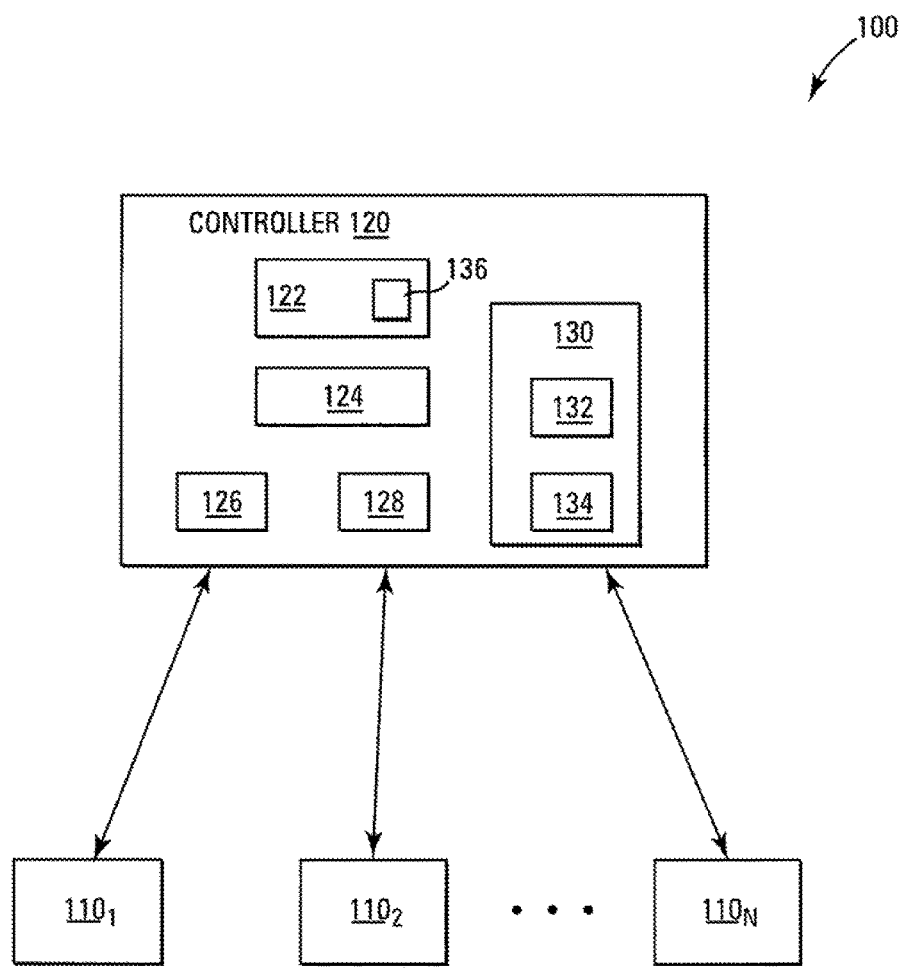
FIG. 1 is a block diagram of a video monitoring system, according to an embodiment of the present invention.

In the following detailed description, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. It is to be understood that other embodiments may be utilized and that process, electrical, and/or mechanical changes may be made without departing from the scope of the claimed subject matter. The following detailed description is, therefore, not to be taken in a limiting sense, and the scope of the present disclosure is defined only by the appended claims and equivalents thereof.

FIG. 1 is a block diagram of a video monitoring system 100, such as may be used for video surveillance, according to an embodiment. Video monitoring system 100 includes cameras $110_1$-$110_N$ coupled to a controller 120, such as a master video server. Monitoring devices, such as cameras 110, e.g., analog or digital video cameras, are respectively directed at exits of a facility, such as a retail store, library, etc. It will be appreciated that for some facilities, exits can also serve as entrances, so hereinafter "exit" will be used to denote exits of facilities having separate exits and entrances and to denote combined exits and entrances of facilities when the combined exits and entrances are being used as exits.

Controller 120 and cameras 110 may be coupled (e.g., electrically, wirelessly, etc.) to each other over a network, such as a local area network (LAN). For one embodiment, controller 120 may provide an interface for a user to interact with cameras 110. Controller 120 may be a computer, such as a personal computer, e.g., with a video display 122. Controller 120 may also include a keyboard 124 for inputting information into controller 120, and a pointing device (not shown), such as a "mouse," for controlling a cursor displayed on video display 122. For one embodiment, controller 120 may be configured to display video, such as analog or digital video, respectively received from cameras $110_1$ to $110_N$ in "windows" displayed on video display 122.

Controller 120 includes processor 126 for processing computer-readable instructions. These computer-readable instructions are stored in a memory 128, such as a computer-usable medium, and may be in the form of software, firmware, or hardware. The computer-readable instructions configure controller 120 to perform the operations and methods of the various embodiments of the present invention described below.

In a hardware solution, the computer-readable instructions are hard coded as part of processor 126, e.g., an application-specific integrated circuit (ASIC) chip. In a software or firmware solution, the instructions are stored for retrieval by the processor 126. Some additional examples of computer-usable media include static or dynamic random access memory (SRAM or DRAM), read-only memory (ROM), electrically erasable programmable ROM (EEPROM or flash memory), magnetic media and optical media, whether permanent or removable. Most consumer-oriented computer applications are software solutions provided to the user on some form of removable computer-usable media, such as a compact disc read-only memory (CD-ROM) or digital video disc (DVD). Controller 120 may include a storage device 130, such as a hard drive, removable flash memory, etc., for storing image data corresponding to video images captured by cameras $110_1$-$110_N$.

Figure 2:
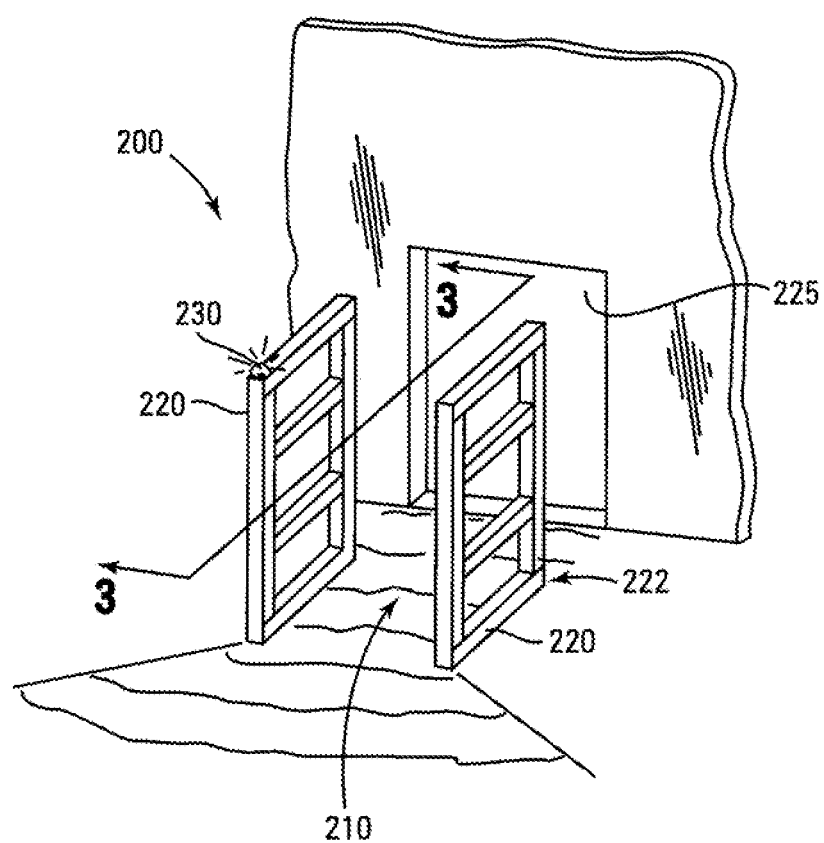
FIG. 2 is a pictorial view illustrating an exit area of a facility, according to another embodiment of the present invention.
Figure 3:
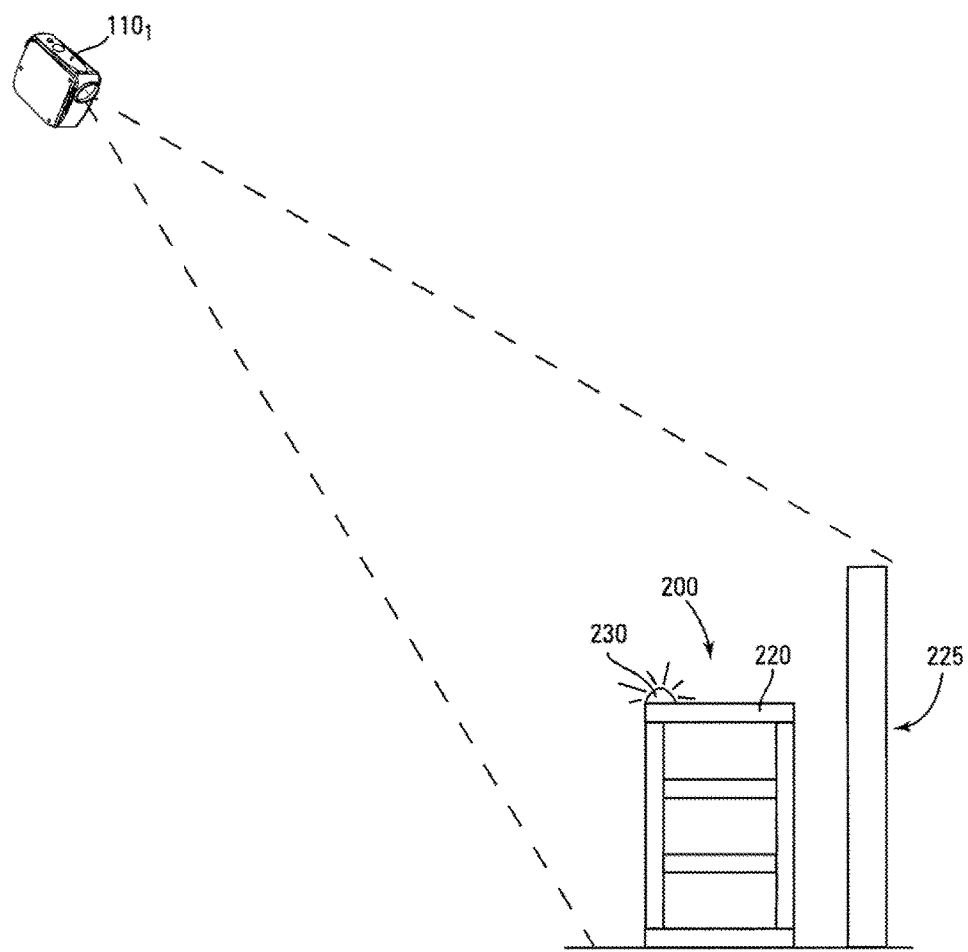
FIG. 3 is a view taken along line 3-3 of FIG. 2, illustrating video monitoring of the exit area of FIG. 2, according to another embodiment of the present invention.

FIG. 2 is a pictorial view illustrating an exit area 200 of the facility, according to one embodiment. Exit area 200 may include a detection zone 210 located between a pair of towers 220 of a detection system 222, such as a detection system of an electronic article surveillance (EAS) system, located in front of a doorway 225 that serves as an exit from the facility. At least one camera, e.g., camera $110_i$, of cameras $110_1$-$110_N$ is directed at exit area 200, as shown in FIG. 3, a view taken along line 3-3 of FIG. 2.

A detection zone 210 and a detection system 222 may be located in front of at least one of an exit for guests of the facility and an exit specifically for employees of the facility. For example, there may be a detection zone 210 and a detection system 222 located in front of each of a plurality of exits of the facility. During operation, guests and/or employees pass through detection zone 210 between towers 220 before exiting the facility through doorway 225. Note that a portion of detection zone 210 may also be located outside of the region between towers 220. Note further that doorway 225 may also serve as an entrance to the facility in which case guests and/or employees pass through detection zone 210 between towers 220 after entering the facility through doorway 225.

Detection system 222 can detect an activated (e.g., an excited) tag affixed to an article, such as an article of merchandise, a book, etc., that moves past detection system 222, e.g., by moving through detection zone 210 between towers 220 or by moving around towers 220 without going between towers 220. At least one of towers 220 may include a transponder (e.g., sometimes called a reader or an interrogator) for detecting an activated tag, e.g., by detecting a signal from the tag. For example, when an article with an activated tag passes through detection zone 210 between towers 220 or around towers of detection system 222, the transponder in detection system 222 detects the signal from the activated tag and activates an alarm in response to detecting that signal. The alarm causes a light source (or light) 230 to illuminate, as shown in FIGS. 2 and 3. The alarm may also include an audible alarm, such as the sounding of a buzzer, horn, bell, etc.

The tag affixed to an article can be an electronic-article-surveillance (EAS) tag, such as a radio frequency identification (RFID) tag; detection system 222 is an EAS system, such as an RFID system; and the alarm is an EAS alarm. It should be understood that an RFID tag may include an integrated circuit attached to an antenna. During operation, the transponder of detection system 222 may send a signal to the antenna that provides enough power to cause the RFID tag to power-up. Once the RFID tag is powered up, the tag outputs a signal via the antenna to the transponder of detection system 222, causing the transponder of detection system 222 to activate the alarm in response to detecting the signal.

Figure 4:
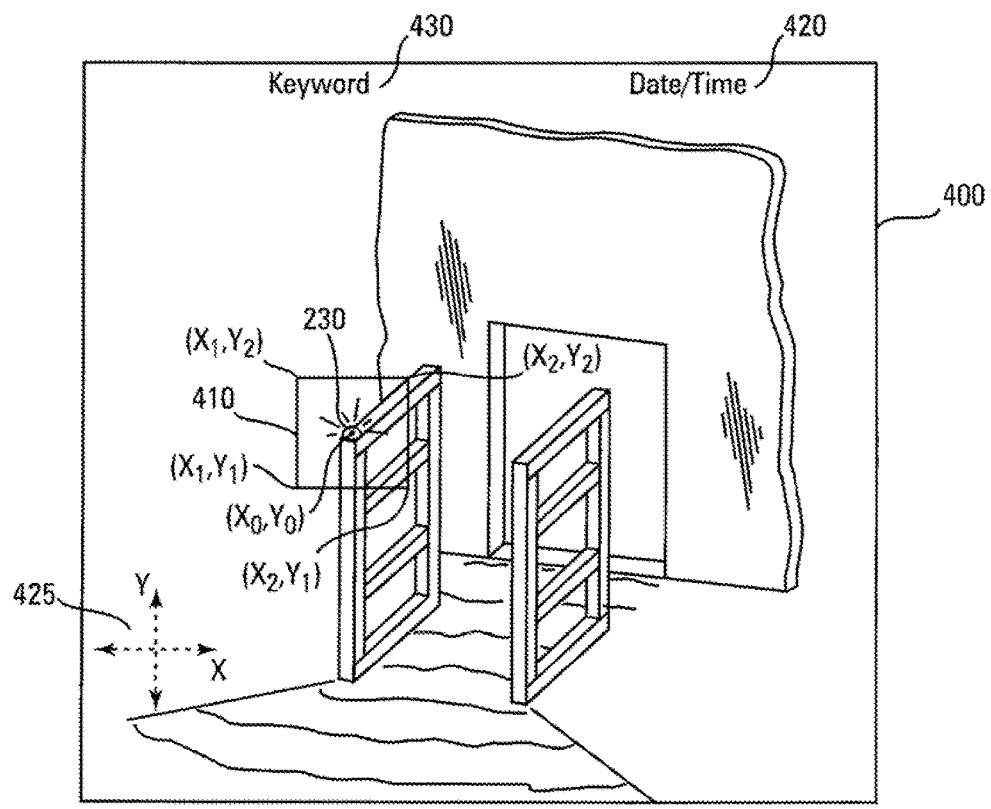
FIG. 4 illustrates an image field captured by a camera of the video monitoring system of FIG. 1, according to another embodiment of the present invention.

Controller 120 receives image data, corresponding to the images captured by each of cameras to $110_1$-$110_N$. Controller 110 also receives image data corresponding to an image field 400 captured by camera $110_i$ that contains the image of exit area 200, including detection system 222, of FIGS. 2 and 3, as shown in FIG. 4. Note that the image data contained in image field 400 is contained in video captured by camera $110_i$. Controller 120 is configured to store the image data from each of cameras $110_1$-$110_N$ in a database 132, e.g., in storage device 130.

For one embodiment, controller 120 is configured to determine that light source 230 illuminates by determining that the image of light source 230 within image field 400 illuminates. For example, controller 120 may determine that light source 230 illuminates by determining that the brightness of a portion of the video recorded by camera $110_i$ that contains an image of light source 230 changes by at least a certain amount. That is, controller 120 may determine that light source 230 illuminates by determining that a brightness of a portion of image field 400 that contains light source 230 changes by at least the certain amount. For example, controller 120 may be configured to determine that the brightness of the pixels of the portion of image field 400 that contains light source 230 changes by at least the certain amount.

Controller 120 may be configured to average the brightness over the pixels of the portion of image field 400 that contains light source 230 to determine a numerical value indicative of the average brightness. Controller 120 maybe further configured to determine a difference between numerical values indicative of the average brightness at two different times to determine whether the difference between those numerical values is greater than or equal to the certain amount. Controller 120 may then determine that light source 230 illuminates when the difference between those numerical values is greater than or equal to the certain amount.

The certain amount may be determined empirically by obtaining a first numerical value indicative of the average brightness when light source 230 is not illuminated (e.g., OFF) and a second numerical value indicative of the average brightness when light source 230 is illuminated (e.g., ON), and then taking the certain value to be the numerical difference between the first and second numerical values. The first numerical value may correspond to an average voltage that is directly proportional to the average brightness of the pixels when light source 230 is OFF, and the second numerical value may correspond to an average voltage that is directly proportional to the average brightness of the pixels when light source 230 is ON.

For example, each camera 110 may include an array of radiation (e.g., light) sensing elements, e.g., charged coupled device (CCD) radiation sensing elements, that correspond on a one-to-one basis to the pixels of the image field 400 of that camera 110. Each of the light sensing elements outputs an analog voltage in response to receiving light thereat that is directly proportional to the intensity (e.g., brightness) of the light, i.e., the voltage increases as the intensity increases. The analog voltages may be digitized using an analog to digital converter to create digital voltages. Controller 120 receives either the analog or digital voltages from the camera 110 corresponding to the pixels of image field 400. Controller 120 averages the received voltages produced by the sensors corresponding to the pixels containing light source 230 when light source 230 is OFF to obtain the first numerical value and averages the received voltages produced by those sensors when light source 230 is ON to obtain the second numerical value.

The location of light source 230 within image field 400 may be identified by the point ($x=x_0$, $y=y_0$), e.g., nominally located at the center of light source 230, where x and y are defined by a Cartesian coordinate system 425. Coordinate system 425 is shown in FIG. 4 using dashed lines to indicate that coordinate system 425 is normally not visible. The location of the point ($x=x_0$, $y=y_0$) may be predetermined and stored in storage device 130 of controller 120 for retrieval in response to controller 120 determining that light source 230 is illuminated. For one embodiment, controller 120 may be configured to monitor the pixels corresponding to light source 230 and containing the point ($x=x_0$, $y=y_0$) for changes in the brightness of the pixels corresponding to light source 230.

Alternatively, the location of the point ($x=x_0$, $y=y_0$) may be determined in response to controller 120 determining that light source 230 is illuminated. That is, controller may be configured to take the location of the point ($x=x_0$, $y=y_0$) to be the center of the pixels whose brightness has changed by the certain amount as the result of light source 230 illuminating.

Controller 120 may be further configured to form a geometrical object 410, such as a circle, square, ellipse, etc., around light source 230 in response to determining that light source 230 is illuminated. That is, controller 120 may form geometrical object 410 around the point ($x=x_0$, $y=y_0$) such that the point ($x=x_0$, $y=y_0$) forms the center of geometrical object 410. Geometrical object 410 may be formed by highlighting portions, e.g., pixels, of image field 400 that coincide with geometrical object 410. That is, controller 120 may cause these pixels to contrast with regions within and around geometrical object 410. For example, controller 120 may set the pixels to a certain color that produces the contrast.

Controller 120 may determine the locations of the pixels within image field 400 that coincide with geometrical object 410 using an equation or set of equations for geometrical object 410, such as for a circle, square, ellipse, etc. For the example in FIG. 4, where geometrical object 410 is square, the locations of the pixels are determined from the following set of equations: $y=y_1$ and $y_2$ for $x_1 \leq x \leq x_2$ and $x=x_1$ and $x_2$ for $y_1 \leq y \leq y_2$.

Data corresponding to geometrical object 410 is stored in image data files containing images of exit area 200 and detection system 222. Data corresponding to a date/time indicator 420 may also be stored in the stored in those image data files. For example, data corresponding to date/time indicator 420 may be contained in a signal from a clock that is added to the image data, as is known to those having skill in the art.

Controller 120 is configured to indicate an alarm, such as an EAS alarm, in response to determining that light source 230 illuminates. For example, the EAS alarm may be part of a video analytic that is implemented in response to determining that light source 230 illuminates. For one embodiment, the video analytic may be implemented, and thus the EAS alarm may be indicated, in response to forming geometrical object 410 around the image of light source 230. Controller 120 may also be configured to indicate, as part of implementing the video analytic, a location in the database where video of exit area 220 and detection system 222 corresponding to the alarm is stored. Note that the video corresponding to the alarm may start at a time that light source 230 illuminates or at a time just prior to the time that light source 230 illuminates. Indicating the location of the video may be part of the alarm. For example, controller 120 may be configured to tag (e.g., "bookmark") the location in the database in response to determining that light source 230 has illuminated as part of the video analytic. Alternatively, tagging the location in the database may occur in response to forming geometrical object around the image of light source 230.

Controller 120 may be further configured to add an identifier to image data corresponding to the video taken of exit area 200 and detection system 222 as part the video analytic in response to determining that light source 230 illuminates or in response to forming geometrical object 410. The identifier can be added to a signal containing the day and time or a similar signal and written into image data corresponding to a video frame corresponding to the time that light source 230 illuminated or a time just prior to the time that light source 230 illuminated. Note that the video to which the identifier is added corresponds to the alarm indicated by controller 120 in response to determining that light source 230 illuminates.

An identifier may be a randomly generated term, such as a keyword 430 (FIG. 4). That is, controller 120 may be configured to generate the term and to write the term into the image data file. In addition, controller 120 may be configured to include the term as part of the alarm as part of implementing the video analytic. The user can input the term into a global search of the database 132 that contains video recorded by cameras $110_1$ to $110_N$ to locate the image data containing the term. That is, controller 120 may be configured to search the database 132 for the image data corresponding to an alarm in response to the user inputting the term into a search engine of controller 120. For example, when a user entered term matches a term in the image data that image data is located. Controller 120 may be further configured to indicate, e.g., on display 122, each alarm and the location, in the database 132, of the image data corresponding to that alarm. Note that image data corresponding to an alarm is image data corresponding to video corresponding to that alarm, where video corresponding to an alarm is defined above.

Controller 120 may be configured to store one or more identifiers in a certain data file, such as an alarm log 134, in storage device 130 as part of the video analytic in response to determining that light source 230 illuminates or in response to forming geometric object 410. For example, an identifier of each alarm may be stored in the alarm log 134. The identifier of an alarm can be the name of the location of the alarm, e.g., the name of the exit where the alarm occurred. The identifier of an alarm can also include the day and time of the alarm and the type of alarm, e.g., an EAS alarm. Controller 120 may be configured to search for stored video corresponding to a particular camera 410 by the date and time that video was taken in response to a user inputting the date and time, e.g., into a search engine of controller 120.

The alarm log 134 maybe contained in a "folder" 136 displayed on video display 122. The alarm log 134 may also contain the randomly generated term for use by the user in a search of the database.

An identifier (e.g., a randomly generated term, a date and time, etc.) may be stored in alarm log 134 in the form of hypertext so that the user can retrieve the video corresponding to that alarm by selecting the identifier, e.g., by pointing and "clicking." An example of such an identifier is a "bookmark" of the location.

Controller 120 may also be configured to create an image data file specifically for storing video of exit area 200 and detection system 222 corresponding to an alarm as part of implementing the video analytic, in response to determining that light source 230 illuminates or in response to forming geometrical object 410. Controller 120 may be further configured to indicate the name of the image data file as part of implementing the video analytic, e.g., by including the name of the image data file in the alarm log 134. The user may then input the name of the image data file in a search of the database of controller 120 to locate that image data file. Alternatively, the name of the image data file may be in the form of hypertext so that the image data file can be retrieved by selecting the name of the image data file, e.g., by pointing and "clicking."

Figure 5:
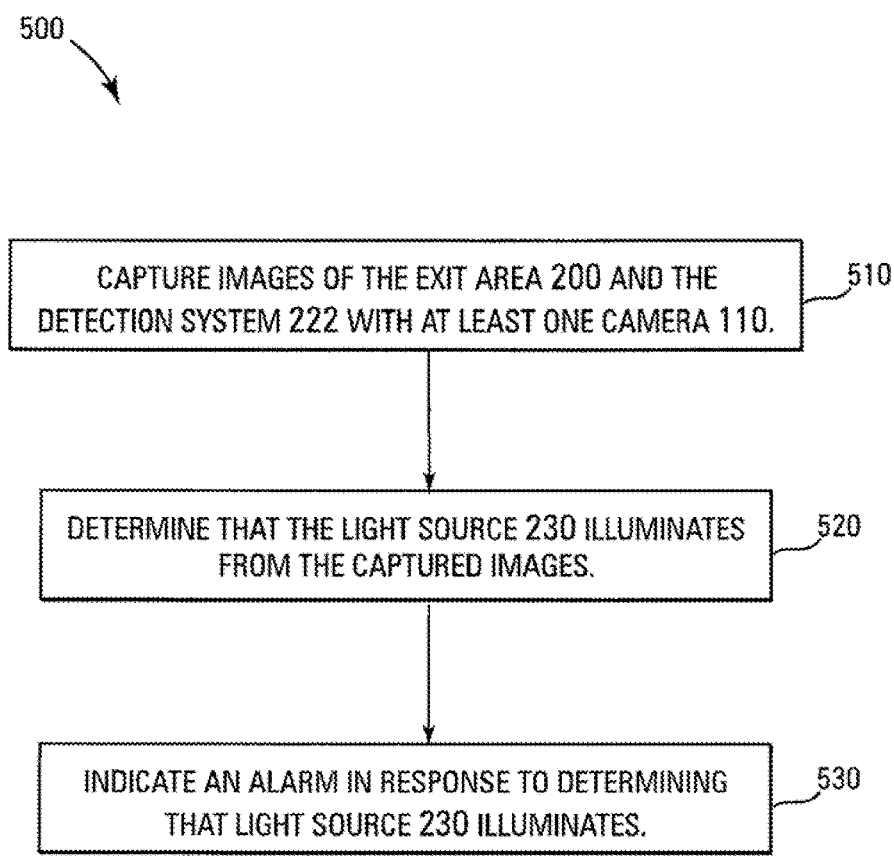
FIG. 5 is a flowchart of a method, according to another embodiment of the present invention.

FIG. 5 is a flowchart of a method 500 of monitoring exit area 200, according to another embodiment. At block 510, images of the exit area 200 and the detection system 222 are captured with at least one camera 110. At block 520, it is determined that light source 230 of detection system 222 illuminates from the captured images of the exit area 200 and the detection system 222. For example, illumination of light source 230 can be determined by determining that a brightness of the portion of image field 400 corresponding to the image of light source 230 changes by at least the certain amount, as described above. At block 530, an alarm is indicated in response to determining that light source 230 illuminates. The alarm may be stored in alarm log 134 in response to determining that light source 230 illuminates. A location, within the database 132, of captured images of the exit area and the detection system corresponding to the alarm may also be stored in alarm log 134 in response to determining that light source 230 illuminates. Note that images of the exit area and the detection system corresponding to an alarm are images of the exit area and the detection system that are obtained starting at a time that light source 230 illuminates or at a time just prior to the time that light source 230 illuminates.

Videos of an exit recorded during an exit alarm, such as an EAS alarm, can provide details of events that transpired during that alarm. For example, the recorded video can be used to judge actions of guests whose articles triggered the alarm, to judge actions of personnel in response to the alarm, to determine the validity of the alarm, etc. Further, the video can be used for improving responses to the alarm, reducing the number of invalid (e.g., false) alarms, etc. Using a video monitoring system, such as video monitoring system 100, to determine whether an alarm, such as an EAS alarm, occurs by determining that an EAS alarm light at an exit illuminates and to indicate where the video corresponding to that EAS alarm is stored can reduce the amount of video that needs to be reviewed in order to find the video corresponding to an EAS alarm.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A monitoring system, comprising:
 a monitoring device directed at a detector, the detector having a light, the monitoring device for obtaining images of the detector; and
 a controller coupled to the monitoring device,
 wherein the controller is configured to determine that the light illuminates from an image of the light contained in the images of the detector, the controller identifying a point on a Cartesian coordinate system as a location of the light,
 wherein the controller is configured to form a geometrical object around the point in response to determining that the light has illuminated, the geometrical object highlighting the image of the light by highlighting pixels in the images of the detector that coincide with the geometrical object, the controller being configured to determine locations of the pixels using an equation or set of equations for the geometrical object using the point on the Cartesian coordinate system, and
 wherein the controller is configured to implement a video analytic in response to forming the geometrical object around the point, and wherein as part of the video analytic, the controller indicates a location in a database where the images of the detector are stored and writes an identifier to image data corresponding to the images of the detector at a time that the light has illuminated.

2. The video monitoring system of claim 1, wherein the controller is further configured to determine that a brightness of a portion of the images of the detector corresponding to the image of the light changes by at least a certain amount in order to determine that the light illuminates.

3. The video monitoring system of claim 1, wherein the controller is configured to add the identifier to a signal containing a time reference.

4. The video monitoring system of claim 1, wherein the identifier is a randomly generated term generated by the controller.

5. The video monitoring system of claim 4, further comprising a search module that enables a user to input the identifier to locate image data containing the randomly generated term.

6. The video monitoring system of claim 4, wherein the controller stores the identifier in an alarm log such that the user can search the alarm log to locate image data.

7. The video monitoring system of claim 6, wherein the controller is configured to store the identifier in the alarm log in the form of a hypertext so that the image data can be retrieved by selecting the identifier.

8. The video monitoring system of claim 1, wherein the controller is configured to create an image data file storing video data from the monitoring device in response to forming the geometrical object around the point as part of implementing the video analytic.

9. A monitoring system, comprising:
 a monitoring device directed at a detector, the detector having a light source, the monitoring device for obtaining images of the detector; and
 a controller coupled to the monitoring device;
 wherein the controller is configured to determine that the light source illuminates from an image of the light source contained in the images of the detector, the controller identifying a point on a Cartesian coordinate system as a location of the light source;
 wherein the controller is configured to determine a location of the point in response to determining that the light source has illuminated by identifying a center of pixels corresponding to the light source whose brightness has changed by a certain amount as a result of the light source illuminating; and
 wherein the controller is configured to implement a video analytic in response to determining that the light source has illuminated, and wherein as part of the video analytic, the controller indicates a location in a database where the images of the detector are stored and writes an identifier to image data corresponding to the images of the detector at a time that the light has illuminated.

10. The video monitoring system of claim 9, wherein the point on the Cartesian coordinate system is predetermined.

11. The video monitoring system of claim 10, wherein the controller is configured to monitor the pixels corresponding to the light and containing the predetermined point on the Cartesian coordinate system for changes in brightness of the pixels.

12. The video monitoring system of claim 9, wherein the controller is configured to indicate an alarm in response to determining that the light source illuminates and storing a location where video of the detector corresponding to the alarm is stored, wherein the controller stores the location by randomly generating a term and writing that term to video of the detector corresponding to the alarm such that the term is displayed with the video and such that a user can input the term to locate the location where the video is stored, and wherein the controller additionally stores the term in an alarm log such that the user can search the alarm log to locate the video.

13. The video monitoring system of claim 12, wherein the controller stores the location by writing an identifier to video of the detector corresponding to the alarm.

14. The video monitoring system of claim 13, wherein the controller is further configured to indicate the identifier when indicating the alarm.

15. The video monitoring system of claim 12, further comprising a data file in which the controller stores the location.

16. A method of monitoring an exit area of a facility, the exit area containing a detection system having a light, the method comprising:
    capturing images of the exit area and the detection system with at least one camera;
    determining that the light illuminates from an image of the light by averaging a brightness over pixels of the image to determine an average brightness, and by determining a difference between numerical values indicative of the average brightness at two different times to determine whether the difference is at least equal to a certain amount;
    identifying a point on a Cartesian coordinate system as a location of the light;
    forming a geometrical object around the point in response to determining that the light has illuminated, the geometrical object highlighting the image of the light by highlighting pixels in the images of the detector that coincide with the geometrical object;
    determining locations of the pixels using an equation or set of equations for the geometrical object using the point on the Cartesian coordinate system;
    indicating an alarm in response to determining that the light illuminates;
    storing a location where the images of the exit area when the alarm is indicated are stored by writing an identifier to image data corresponding to captured images of the exit area and the detection system corresponding to the alarm; and
    storing the identifier of the location of the captured images of the exit area and the detection system corresponding to the alarm and/or an identifier of the alarm in an alarm log, wherein the alarm log is searchable based on the identifier.

17. The method of claim 16, wherein the captured images contain an image of the light, and further comprising forming the geometrical object around the image of the light within the captured images after the light illuminates in response to determining that the light illuminates.

18. The method of claim 16, further comprising implementing a video analytic in response to forming the geometrical object around the point, and as part of the video analytic, indicating a location in a database where the images of the exit area are stored.

19. The method of claim 16, further comprising indicating the identifier when indicating the alarm.

20. The method of claim 19, further comprising retrieving the captured images of the exit area and the detection system corresponding to the alarm in response to a user selecting the identifier.

* * * * *